United States Patent [19]
Furumoto

[11] Patent Number: 5,841,671
[45] Date of Patent: Nov. 24, 1998

[54] APPARATUS FOR THE OPERATION OF A PLANT FOR PRODUCING DEINKED PULP WITH STATE ANALYSERS CONSTRUCTED IN THE FORM OF NEURAL NETWORKS FOR THE WASTE PAPER SUSPENSION

[75] Inventor: Herbert Furumoto, Erlangen, Germany

[73] Assignee: Siemens Aktiengesellschaft, München, Germany

[21] Appl. No.: 617,876
[22] PCT Filed: Sep. 5, 1994
[86] PCT No.: PCT/EP94/02954
§ 371 Date: Mar. 19, 1996
§ 102(e) Date: Mar. 19, 1996
[87] PCT Pub. No.: WO95/08019
PCT Pub. Date: Mar. 23, 1995

[30] Foreign Application Priority Data

Sep. 16, 1993  [EP]  European Pat. Off. .............. 93114965

[51] Int. Cl.⁶ .................................................... G06F 15/46
[52] U.S. Cl. ......................... 364/471.01; 162/4; 162/60; 162/253; 162/262
[58] Field of Search .............................. 364/471.01, 164; 162/253, 252, 262, 238, DIG. 10, DIG. 11, 49, 60, 4

[56] References Cited

U.S. PATENT DOCUMENTS

| 3,016,323 | 1/1962 | Altmann et al. ............................ 162/4 |
| 3,025,213 | 3/1962 | Copeland .................................... 162/4 |
| 5,282,131 | 1/1994 | Rudd et al. .............................. 364/164 |

OTHER PUBLICATIONS

Beaverstock, M. et al., "Pulp & Paper Applications of Neural Networks", TAPPI Proceedings, 1993 Process Control Conf. (Nashville) Proc., pp. 201–206.

Walker, R., "Artificial Intelligence," *Papermaker* (Mar. 1993), pp. 24–26.

Database Paperchem The Institute of Paper Science and Technology, Atlanta, GA, US, AN 63–05322, "Controlling the Future Pulp Mill" (1992) 17–22.

Database Paperchem The Institute of Paper Science and Technology, Atlanta, GA, US, AN 63–07946, Naito, T., "Overview of the Artificial Neural System and Possibility of Its Use in the Paper Industry", No. 8: 959–968 (Aug. 1992).

*Primary Examiner*—Reba I. Elmore
*Assistant Examiner*—Sheela S. Rao
*Attorney, Agent, or Firm*—Kenyon & Kenyon

[57] ABSTRACT

Apparatus for the operation of a plant for producing deinked pulp with state analysers constructed in the form of neural networks for the waste paper suspension.

At least one measuring device (ME) records spectral and/or physical characteristic values (IMf, Mp) of a waste paper suspension (PS). Furthermore, there are closed-loop or open-loop control devices (RS1 . . . RS8) for operating means of a waste paper preparation (AAA) in the plant. According to the invention, there is at least one state analyser (ZA), configured in the form of a neural network (NNg) or a plurality of parallel neural networks (NN1 . . . NN4), for the waste paper suspension (PS). This analyser forms from the characteristic values (IMf, Mp) controlled variables (ST: AB, AZ, FL, AA, AS, AT) for process control of the closed-loop or open-loop control devices (RS1 . . . RS8) of operating means at least of the waste paper preparation (AAA). As controlled variables, the ratio of white to coloured papers (AB), the ratio of illustrated-magazine paper to newsprint paper (AZ), the average fibre length (FL), the ash content (AA), the content of dirt (AS) and/or the content of adhesive contaminants (AT) in the waste paper suspension (PS) are suitable with preference.

21 Claims, 5 Drawing Sheets

APPARATUS FOR THE OPERATION OF A PLANT FOR PRODUCING DEINKED PULP WITH STATE ANALYSERS CONSTRUCTED IN THE FORM OF NEURAL NETWORKS FOR THE WASTE PAPER SUSPENSION

Apparatus for the operation of a plant for producing deinked pulp with state analysers constructed in the form of neural networks for the waste paper suspension.

BACKGROUND OF THE INVENTION

In the production of deinked pulp using as great a proportion as possible of waste paper, one problem is that the quality of the waste paper introduced into an apparatus for waste paper preparation in the plant for producing deinked pulp, i.e. pulp intended for producing recycled paper, varies greatly. Depending on the respective mixture of the waste paper, it may contain greatly varying proportions of, for example, coloured illustrated-magazine papers, grey newsprint papers, white papers, soiled papers, old books, for example with glued spines, such as, telephone directories, cardboard articles, packaging, coated papers, contaminants of all kinds and much more besides. At least the operating means of the apparatus for waste paper preparation must consequently be suitably controlled by a closed-loop or open-loop system in a way dependent on the state of a respectively introduced charge of waste papers in order to obtain a waste paper suspension suitable for the production of deinked pulp and having approximately constant characteristic quality values.

For process control of the waste paper preparation, which is located at the beginning of the plant for producing deinked pulp, one important requirement is to meter as accurately as possible the addition of deinking chemicals and, if appropriate, dispersing chemicals in a way dependent on the current state of the waste paper fed in. Furthermore, the operating means of the waste paper preparation plant serving for homogenizing and sorting the cellulose fibres in the suspension should also be optimally controlled by an open-loop or closed-loop system. However, a prerequisite for exact process control of the waste paper preparation plant is the most accurate and fastest possible instrumentational recording at the intake of the waste paper preparation plant of selected characteristic values of the waste paper suspension obtained by disintegrating waste paper of extremely varied quality and type.

Until now, the state of the waste paper suspension was determined by the measurement of physical characteristic values only. These variables have the disadvantage, however, that they allow the state of the waste paper suspension to be represented only inaccurately with regard to the possible grades of waste paper fed to the preparation plant and their quality characteristics. Consequently, controlling operating means of the waste paper preparation plant with the aid of these variables is possible only inaccurately.

SUMMARY OF THE INVENTION

Against this background, the invention is based on the object of specifying an operating apparatus which permits the best possible process control of a plant for producing deinked pulp.

The object is achieved by the apparatus specified in claim 11. Advantageous further embodiments of the invention are specified in the subclaims.

The apparatus according to the invention includes at least one measuring device for recording spectral and/or physical characteristic values of a waste paper suspension fed in for waste paper preparation. Furthermore, there are selected closed-loop or open-loop control devices for influencing at least operating means of the waste paper preparation plant.

According to the invention, there is at least one state analyser, which is configured in the form of a single neural network or a plurality of parallel neural networks. This analyser is fed the characteristic values of the waste paper suspension, recorded by the measuring device, as input variables. The at least one state analyser determines from these input variables controlled variables which are output at least for process control to closed-loop or open-loop control devices for operating means of the waste paper preparation plant, and if appropriate additionally to closed-loop or open-loop control devices of a following dewatering machine for producing deinked pulp or to closed-loop or open-loop control devices of at least one following paper machine in a plant for producing recycled paper, which processes the deinked pulp.

For the construction of the state analyser, known neural networks, available for example as software modules for process computing systems, can be used. The setting of the neural network takes place in a known way by so-called "training" with the assistance of as large a number as possible of measured values which are obtained by manual laboratory analysis of the waste paper suspension.

According to a preferred configuration of the invention, either the ratio of coloured papers to white papers and/or the ratio of illustrated-magazine papers to newsprint papers in the amount of waste paper processed to form the waste paper suspension are determined by the at least one state analyser as controlled variables. It has been found that these ratios are particularly suitable for describing the current state of the waste paper suspension, and, according to the invention, are used alternatively or else jointly as preferred controlled variables for the process control. They are used inter alia for the process control of apparatuses for metering so-called deinking chemicals into the waste paper suspension. This is a means of dissolving out printing inks which have been introduced into the waste paper suspension via the waste paper and would result in an inadmissibly strong grey haze in recycled paper. These can be subsequently washed out.

In a further embodiment of the invention, values for the average fibre length and/or the ash content in the waste paper suspension are made available by the common neural network or by the plurality of parallel neural networks in the state analyser. These can serve as further controlled variables, in particular for controlling the operating means of the preparation plant serving for fibre sorting and for extracting unusable constituents to be rejected from the waste paper suspension.

In a further configuration of the invention, count values for the content of dirt and/or for the content of adhesive contaminants in the waste paper suspension can be additionally provided by the common neural network or the plurality of parallel neural networks. These values also can be used advantageously as controlled variables, inter alia for the operating means of the preparation plant serving for homogenizing the cellulose fibres in the waste paper suspension and for the operating means of the preparation plant serving for metering in dispersing chemicals.

Advantageously, the intensities of the respective wavelength ranges reflected and/or transmitted by the waste paper suspension under irradiation at selected wavelength ranges of visible and/or infrared light are recorded as spectral characteristic values, and are fed to the at least one state analyser as input variables. In a further embodiment of the invention, wavelength ranges which belong to the blue, red and/or green component of light are selected for the visible light, and the intensities reflected and/or transmitted by the waste paper suspension under irradiation with light from these wavelength ranges are measured as spectral characteristic values. Advantageously, the intensities in the near range and/or in the far range reflected and/or transmitted by the waste paper suspension under irradiation with light from the infrared wavelength range may also be instrumentationally recorded additionally as spectral characteristic values.

For this type of measurement, the stream of waste paper suspension is illuminated with selected wavelengths of visible and, if appropriate, additionally of infrared light by the so-called incident light or transmitted light technique. Suitable for this purpose are, for example, so-called "white measuring instruments". These are equipped with light-emitting diodes, which emit light at different wavelengths. In this case there may be light-emitting diodes for visible light in the blue, red and green wavelength range, and light-emitting diodes for invisible light in the infrared wavelength range. The intensities of these characteristic spectral colours occurring after reflection at the pulp stream of the waste paper suspension or after passing through the pulp stream can be recorded, for example with the aid of a photospectrometer, as characteristic values. Advantageously, the consistency and/or the temperature of the waste paper suspension may be additionally measured with preference as physical characteristic values and fed to the at least one state analyser as input variables.

The controlled variables formed by the at least one neural network in the state analyser may be used individually, in groups or in their entirety also for the process control of operating means of the at least one paper machine in a following recycled paper plant. For this purpose, they are output to corresponding closed-loop or open-loop control devices of the paper machine.

According to a further configuration of the invention, at least one additional measuring device may be arranged inside the waste paper preparation plant for recording spectral and/or physical characteristic values of the waste paper suspension. Arranged downstream of this device is at least one further state analyser, according to the invention again configured in the form of a neural network or a plurality of parallel neural networks. The controlled variables provided by this are output for process control to closed-loop or open-loop control devices, which belong to operating means of the waste paper preparation plant or the paper machine which are arranged downstream of the additional measuring device and the further state analyser in the direction of the process sequence.

This additional measuring device consequently evaluates a waste paper suspension which has already passed through one or more upstream operating means of the waste paper preparation plant. The waste paper suspension has consequently already experienced a number of "cleanings", so that its quality has approached the state necessary for producing deinked pulp. The process control of downstream operating means can take place much more accurately with the aid of such updated spectral and/or physical characteristic values and the controlled variables derived from them by the at least one state analyser, than if only characteristic values of the waste paper suspension in the initial state are recorded at the intake of the waste paper preparation with a single measuring device and a following state analyser.

BRIEF DESCRIPTION OF THE DRAWINGS

The invention is explained in more detail with reference to the exemplary embodiments contained in the figures referred to briefly below, in which.

DETAILED DESCRIPTION OF THE INVENTION

Figure 1:
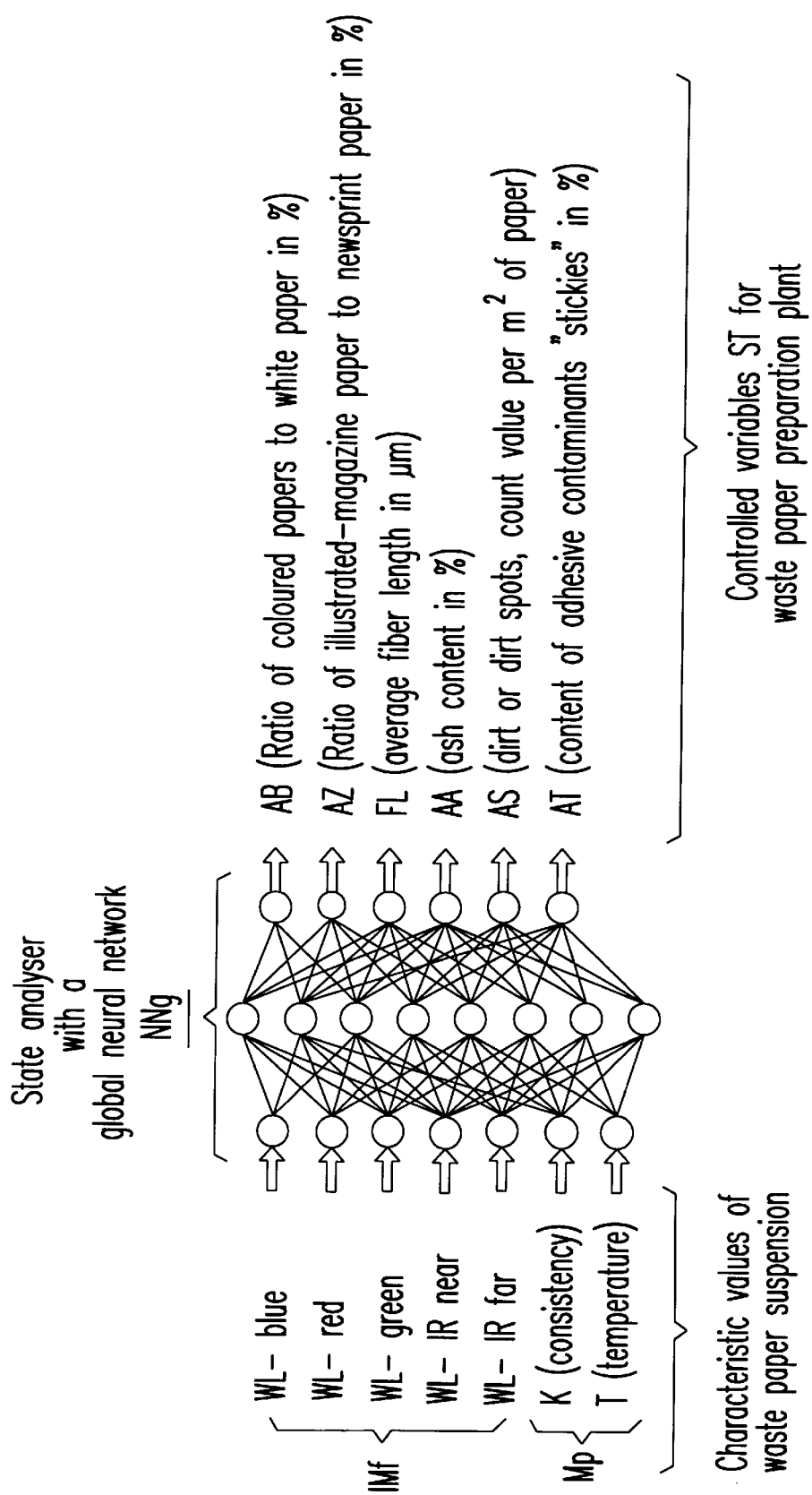
FIG. 1 shows an example of a state analyser, constructed in the form of a global neural network, for the waste paper suspension.

FIG. 1 shows the example of a state analyser for the waste paper suspension, which is constructed in the form of a single, global neural network NNg. This is fed, for example, the spectral characteristic values IMf, recorded by at least one measuring device, and the physical characteristic values Mp as input variables. In the example represented in FIG. 1, the intensities occurring under irradiation of the waste paper suspension at selected wavelength ranges of visible and infrared light are envisaged as spectral characteristic values IMf. Thus, by way of example, the neural network NNg is fed as characteristic values the intensity WL-blue in the wavelength range for blue visible light, the intensity WL-red in the wavelength range for red visible light and the intensity WL-green for visible light from the green wavelength range. Further spectral characteristic values are the intensity WL-IR near for invisible infrared light in the near range and the intensity WL-IR far for invisible infrared light in the far range. As physical characteristic values Mp, the neural network NNg is fed the consistency K and the temperature T of the waste paper suspension.

According to the invention, from these input variables the neural network NNg in the state analyser determines controlled variables, which are output for process control to the closed-loop or open-loop control devices of operating means of the waste paper preparation plant and, if appropriate, to a paper machine in a recycled paper plant. In the case of the example represented in FIG. 1, the global neural network NNg makes the following controlled variables ST available with preference at the output neurons:

AB: ratio of coloured papers to white papers in the amount of waste paper introduced, AZ: ratio of illustrated-magazine papers to newsprint papers in the amount of waste paper introduced, FL: average length of the pulp fibres in the waste paper suspension (for example in micrometers), AA: content of ash (for example kaolin, colour pigments and the like) in the waste paper suspension (in per cent), AS: density of dirt spots in the waste paper suspension or count value of dirt or dirt spots, for example per square metre of recycled paper, and AT: content of adhesive contaminants in the waste paper suspension (so-called "stickies", i.e. thermoplastic constituents which originate, for example, from coatings and book bindings).

In other embodiments of the invention, the variables AB and AZ, i.e. the ratios of coloured papers to white papers and illustrated-magazine papers to newsprint papers in the amount of waste paper introduced, may also be made available separately by a plurality of neural networks. Thus, in FIGS. 2a–2d the example of a state analyser which comprises four parallel neural networks NN1 . . . NN4 is represented. All the networks are fed the spectral characteristic values IMf, already described for the example of FIG. 1, at the input neurons. Of the physical characteristics Mp, all the sub-neural networks NN1 . . . NN4 are fed the consistency K, while the temperature T of the waste paper suspension is additionally fed only to the sub-neural network NN4.

Figure 2A:
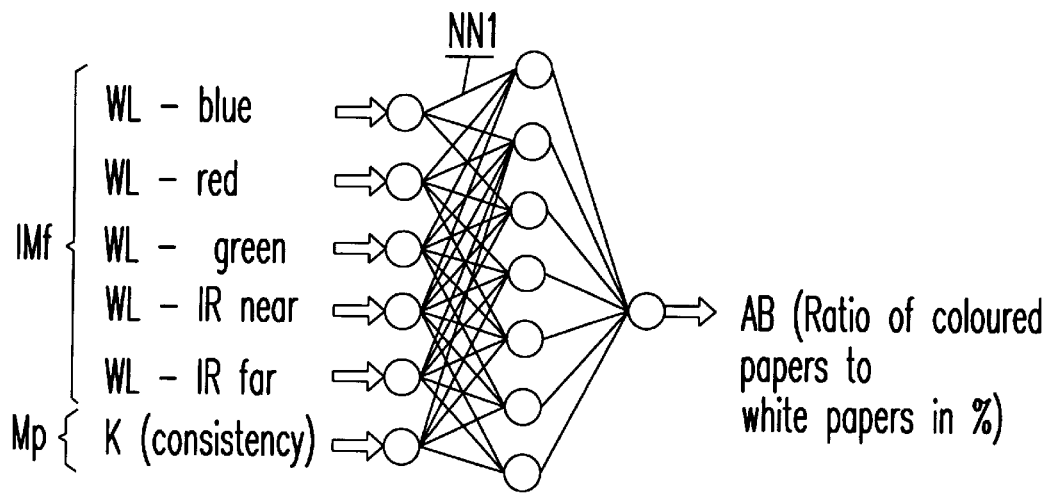
FIGS. 2a–2d show a further example of a state analyser, constructed in the form of four sub-neural networks, for the waste paper suspension.
Figure 2B:
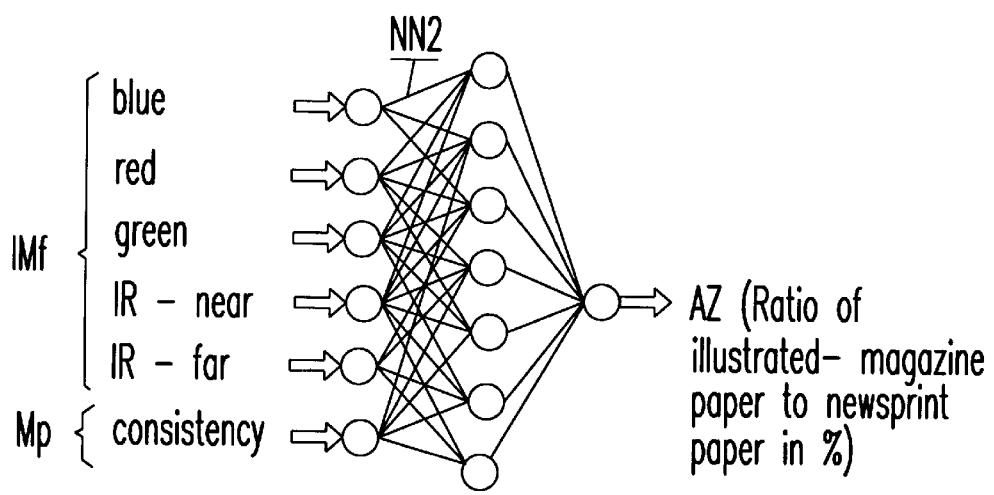
Figure 2C:
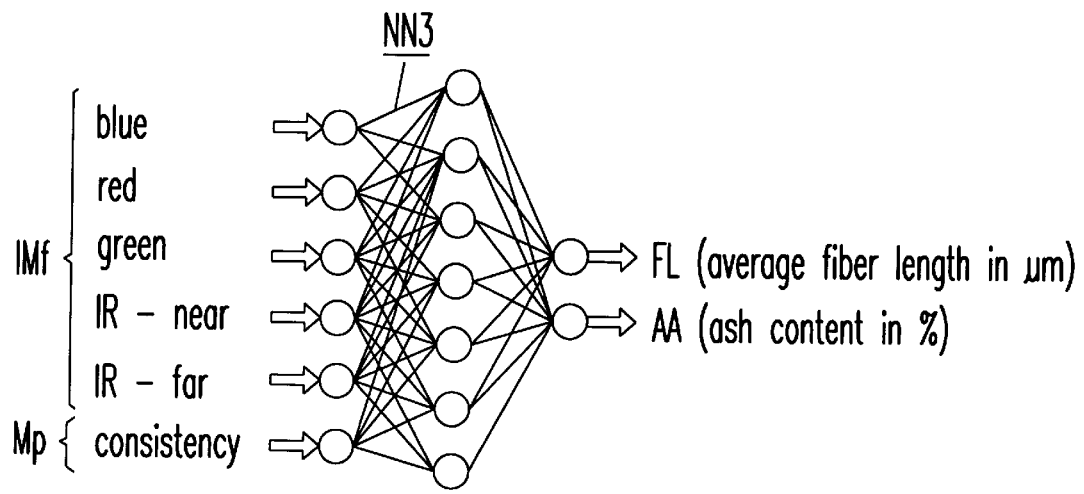
Figure 2D:
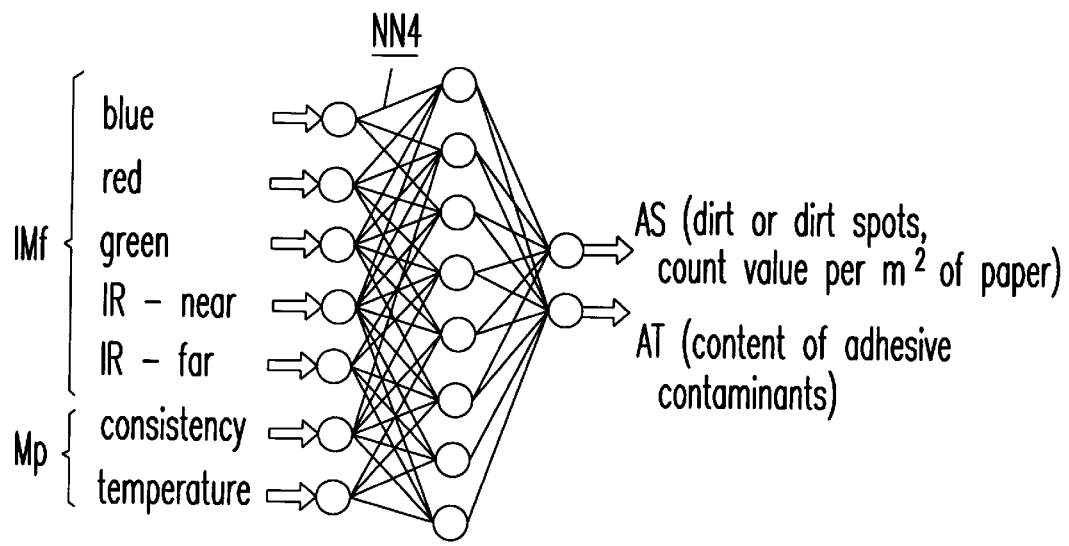

The sub-networks NN1 and NN2 of the state analyser represented in FIGS. 2a and 2b, respectively, form the ratio AB of coloured papers to white papers and the ratio AZ of illustrated-magazine papers to newsprint papers, respectively, in the amount of waste paper processed to form the waste paper suspension. Both variables serve as controlled variables for process control for the closed-loop or open-loop control devices of the operating means of the plant for producing deinked pulp. The third sub-neural network NN3 of the state analyser, in FIG. 2c, is designed such that the values of the average fibre-length FL and of the ash content AA in the waste paper suspension output as are controlled variables for the process control. Finally, the fourth sub-neural network NN4, in FIG. 2d, determines from the abovementioned input variables a count value AS for the content of dirt or dirt spots and a count value AT for the content of adhesive contaminants in the waste paper suspension. The sub-networks NN3 and NN4 are consequently advantageously designed such that in each case a pair of mutually associated controlled variables FL, AA and AS, AT is respectively formed. In this way, the so-called training of the neural networks NN3, NN4 with the aid of measured values obtained analytically in the laboratory is also facilitated. Thus, for example in a determination of the count value AS for the dirt with the aid of a laboratory analysis, the related count value AT for the content of adhesive contaminants can also be determined in an easy way.

In contrast, the sub-neural networks NN1 and NN2 respectively form with preference only a single controlled variable AB and AZ respectively. These values can consequently be determined very accurately independently of each other. This is advantageous, since the ratio values AB, AZ are important main controlled variables for the process control of the recycling plant, which are often not used simultaneously but only alternatively. By virtue of the separate determination of the ratio values with the aid of a dedicated sub-network in each case, there is for example the possibility of using for process control in an individual case the measured value which appears more plausible in that particular case.

Figure 3:
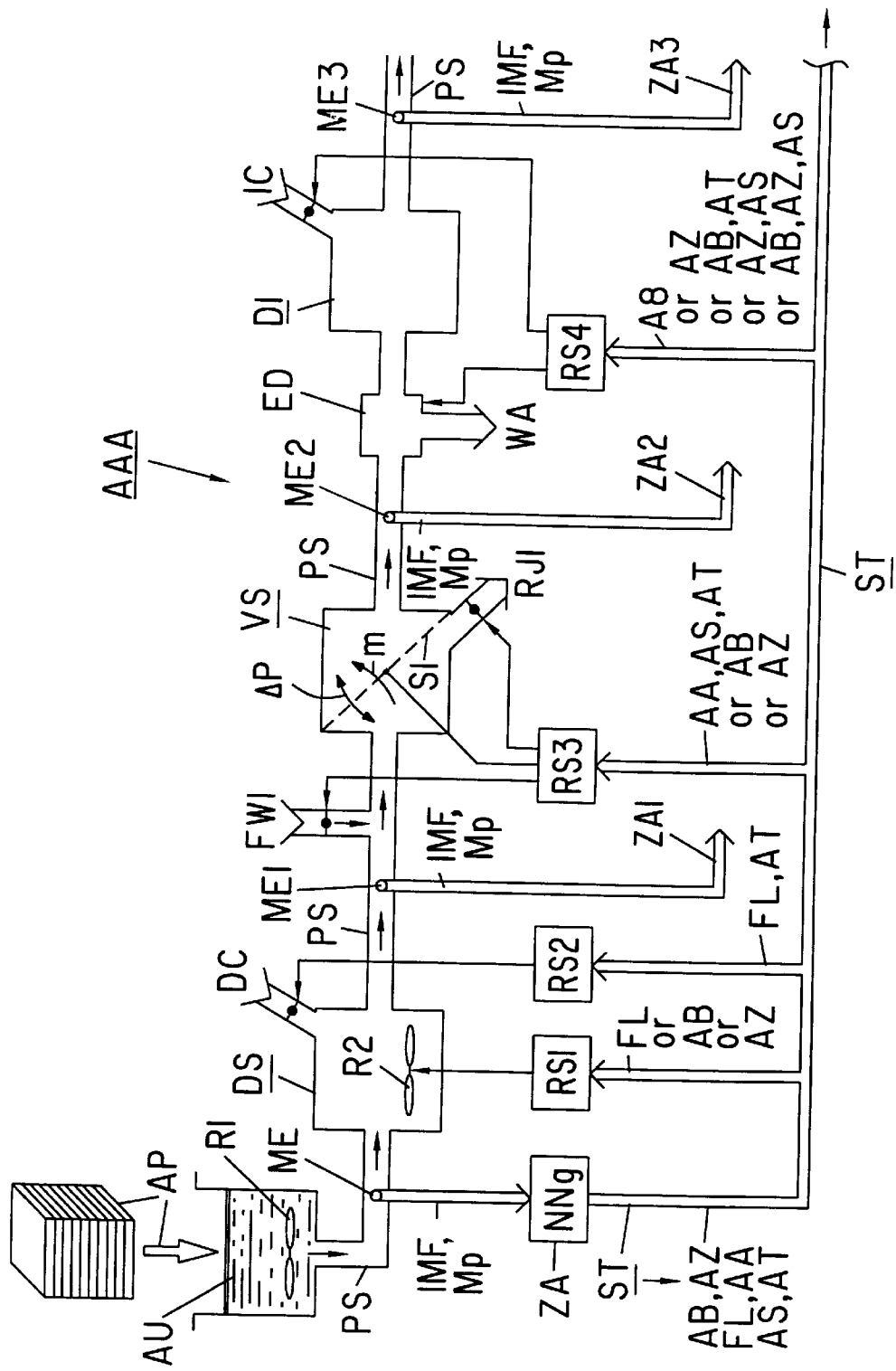
FIGS. 3 and 4 show a block diagram for an exemplary plant for producing recycled paper, with a representation of individual operating means and their control by signals from state analysers.
Figure 4:
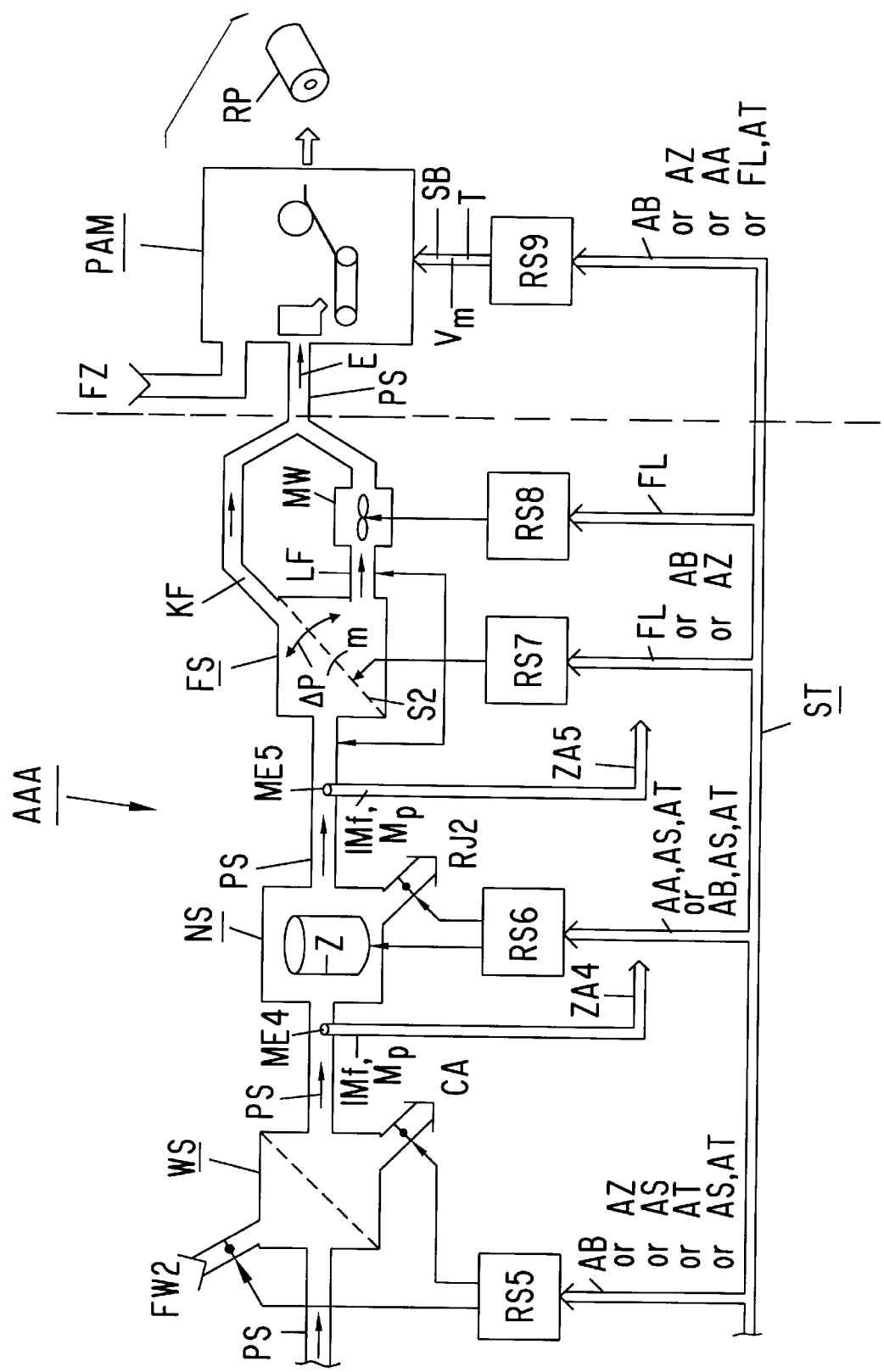

In the related FIGS. 3 and 4 there is represented in the form of a block diagram an example of an overall plant for generating recycled paper RP, comprising an upstream waste paper preparation AAA and a downstream paper machine PAM, the latter directly processing the deinked pulp formed.

At the intake of the plant there is a disintegrator AU, in which waste paper AP introduced is converted with the aid of an agitator R1 and the appropriate addition of fresh water into a waste paper suspension PS. This is fed to a first operating means of the preparation plant, which, in the form of a defibrator DS with agitator R2, effects a first homogenization of the fibres in the waste paper suspension. Furthermore, dispersing chemicals DC may be added into the defibrator or into the pulp stream in order to speed up the disintegration of lumps of fibre.

The waste paper suspension PS treated in such a way is fed, if appropriate with the addition of further fresh water FW1, to a presorter VS as a further operating means of the plant. By means of a wire S1, unusable constituents of the waste paper suspension are eliminated in the form of a so-called reject RJ1, while usable fibre constituents pass through the wire S1 and go on to further operating means of the plant.

In the case of the example represented in FIG. 3, the presorted waste paper suspension PS is fed to a concentrator ED, for the purpose of adjusting the consistency. Excess water WA occurring during concentrating is drained off. There follows as an important operating means of the waste paper preparation a so-called deinker DI. This is fed deinking chemicals IC for chemically neutralizing dyes in the waste paper suspension. The suspension PS prepared in this way is then fed to a washer WS as a further operating means of the plant. This washer is represented on the left-hand side of the following FIG. 4. The washer has a fresh water feed FW2 and a wastewater or chemical discharge CA. As a further operating means, there may follow a post-sorter NS. In the latter, further unusable constituents of the waste paper suspension PS are eliminated with the aid of a rotating cylinder or a battery of cyclones Z (not shown) and discharged as reject RJ2.

At this point of the plant AAA, the waste paper suspension is already prepared for high grade. As one of the last operating means there follows in the example of FIG. 4 a fibre sorter FS. In the latter, a separation of the waste paper suspension PS into two pulp streams is effected with the aid of a wire S2. The one stream KF substantially contains short pulp fibres, which are suitable directly for the production of recycled paper. The second pulp stream LF has substantially long pulp fibres, which are fed for comminution to a grinder MW. Subsequently, the pulp streams are reunited. The waste paper suspension PS has at this end D of the waste paper preparation AAA attained such a quality that deinked pulp can be produced from it by means of a dewatering machine (not shown). In the example represented, the waste paper suspension AP is fed directly to a following paper machine PAM for the production of recycled paper RP. If appropriate, a small content of fresh pulp FZ is added beforehand.

In the lower half of the block diagram of FIGS. 3 and 4, exemplary closed-loop or open-loop control devices RS1 . . . RS9 for the process control of operating means of the waste paper preparation AAA, and exemplary closed-loop or open-loop control devices for the process control of the following paper machine PAM are represented. One possible embodiment for the forming of controlled variables by at least one state analyser ZA, and their possible assignments to the closed-loop or open-loop control devices of the individual operating means, are explained in more detail furthermore with reference to FIGS. 3, 4.

Thus, on the left-hand edge of the block diagram of FIG. 3 there is a measuring device ME, which records spectral characteristic values IMf and physical characteristic values Mp of the waste paper suspension PS formed in the disintegrator AU. The characteristic values are fed as input variables to a state analyser ZA, configured with preference according to the exemplary embodiment of FIG. 1 in the form of a single global neural network NNg. The said analyser forms from these input variables a set of controlled variables ST, which preferably comprises the values already explained above AB, AZ, FL, AA, AS and AT. The state analyser ZA may also be configured in the form of a plurality of parallel sub-neural networks, for example according to the example represented in FIGS. 2a–2d.

The controlled variables ST are fed to the individual closed-loop or open-loop control devices RS1 . . . RS8, RS9 individually or in selected sub-groups for the purpose of process control of the connected operating means. Thus, the value of the average fibre length FL or the ratio AB of coloured papers to white papers or the ratio AZ of illustrated-magazine papers to newsprint papers may serve with preference as the controlled variable for the closed-loop or open-loop control device RS1, which drives the rotor R2 in the defibrator DS, serving as the operating means.

The further closed-loop or open-loop control device RS2 influences that operating means of the waste paper preparation plant AAA which meters dispersing chemicals DC into the defibrator DS or into the pulp streams. The pair of values from the average fibre length FL and the content AT of adhesive contaminants of the waste paper suspension are suitable with preference as controlled variables ST for RS2.

The closed-loop or open-loop control device RS3 which follows in the block diagram of FIG. 3 influences on the one hand the consistency of the waste paper suspension PS by controlling the fresh water feed FW1, and on the other hand the wire S1 in the following presorter VS. Suitable with preference as controlled variables ST for RS3 is the group of values comprising the ash content AA, the content AS of dirt and the content AT of adhesive contaminants in the waste paper suspension. As an alternative to this, however, either the ratio AB of coloured papers to white papers or the ratio AZ of illustrated-magazine paper to newsprint paper in the waste paper suspension may also serve as the controlled variable for RS3.

In the block diagram of FIG. 3 there follows the closed-loop or open-loop control device RS4, which influences the concentrator ED and the means serving for the addition of deinking chemicals IC into the deinker DI. Particularly suitable as the controlled variable is the ratio AB of coloured papers to white papers or the ratio AZ of illustrated-magazine paper to newsprint paper in the waste paper suspension. As an alternative to this, groups of controlled variables may also serve for process control. Thus, RS4 may also be fed as controlled variables the pair of values from the ratio AB of coloured papers to white papers and the content AT of adhesive contaminants or the pair of values from the ratio AZ of illustrated-magazine paper to newsprint paper and the content AS of dirt in the waste paper suspension. Finally, the group of controlled variables comprising the ratio AB of coloured papers to white papers, the ratio AZ of illustrated-magazine papers to newsprint papers and the content AS of dirt is also suitable for the process control of RS4.

There follows on the left-hand side of FIG. 4 the closed-loop or open-loop control device RS5, which influences a fresh water feed FW2 and a chemical discharge CA at the washer WS for the waste paper suspension PS. Particularly suitable as the controlled variable for RS5 is the ratio AB of coloured papers to white papers, or the ratio AZ of illustrated-magazine papers to newsprint papers, or the content AS of dirt, or content AT of adhesive contaminants in the waste paper suspension. Alternatively, the group of controlled variables comprising the content AS of dirt and the content AT of adhesive contaminants may also be used for the process control of RS5.

In the block diagram of FIGS. 3, 4 there then follows the closed-loop or open-loop control device RS6, which influences the rotational speed of a centrifugal sorter Z in the post-sorting apparatus NS and the discharge of reject RJ2 from the latter. The group of controlled variables comprising the ash content AA, the content AS of dirt and the content AT of adhesive contaminants of the waste paper suspension is particularly suitable. Alternatively to this, the group of controlled variables ST comprising the ratio AB of coloured papers to white papers, the content AS of dirt and the content AT of adhesive contaminants may also serve for the process control of RS6. In this group, the ratio AZ of illustrated-magazine paper to newsprint paper may also be used instead of AP.

The following closed-loop or open-loop control device RS7 preferably influences the action of the wire S2 in the fibre sorter FS by setting a differential pressure. The value of the average fibre length FL or the ratio AB of coloured papers to white papers or the ratio AZ of illustrated-magazine papers to newsprint papers is suitable as controlled variables for RS7.

The grinder MW for the long-fibre suspension LF, serving as the last operating means of the waste paper preparation plant AAA, is influenced by the closed-loop or open-loop control device RS8. The value FL of the average fibre length in the waste paper suspension PS is suitable in particular as the controlled variable for RS8.

In the example of FIG. 4, there follows a further closed-loop or open-loop control device RS9, which influences selected operating means in the paper machine PAM with the aid of controlled variables ST, which are derived from the waste paper suspension PS by the state analyser ZA with the neural network NNg.

RS9 can be used to control, for example, the ratio SB of wire speed to jet speed, i.e. the degree of charging of suspension onto the wire of the paper machine. Furthermore, the speed Vm of the paper machine PAM and consequently the rate of production for recycled paper RP can be influenced. As a further process variable in the paper machine, the paper drying can be controlled by controlling the heating temperature T of the drying cylinders. For this purpose, the closed-loop or open-loop control device RS9 is in turn fed controlled variables ST individually or in groups. Particularly suitable are the ratio AB of coloured papers to white papers, or the ratio AZ of illustrated-magazine papers to newsprint papers, or the content AA of ash in the waste paper suspension, or the group of controlled variables ST comprising the average fibre length FL and the content AT of adhesive contaminants.

In a further embodiment of the invention, further measuring devices are arranged inside the waste paper preparation plant AAA. Thus, in the block diagram of FIGS. 3, 4, further measuring devices ME1 following the defibrator DS, ME2 following the presorter VS, ME3 following the deinker DI, ME4 following the washer WS and ME5 following the post-sorter NS are shown by way of example. All the measuring devices form as far as possible the same group of spectral and physical characteristic values IMf, Mp from the waste paper suspension PS. Since the measuring devices ME1 . . . ME5 are arranged at different points in the waste paper preparation plant, the characteristic values recorded by them deviate on account of the increasing purity of the waste paper suspension PS.

The characteristic values recorded in this way are advantageously used for the forming of controlled variables by which the operating means downstream in the process sequence are influenced at least in the waste paper preparation. Thus, the characteristic values IMf, Mp recorded by the measuring device ME1 are fed to a further state analyser ZA1, again constructed in the form of at least one neural network. This analyser again forms from these values controlled variables ST with the values AB, AZ, FL, AA, AS, AT. Since these values represent more accurately the actual state of the waste paper suspension PS at the outlet of the defibrator DS, they are advantageously passed on as controlled variables for process control to downstream open-loop and closed-loop control devices, in the example of FIGS. 3, 4 to the closed-loop and open-loop control devices RS3 . . . RS9.

In the same way, the spectral and physical characteristic values IMf, Mp recorded by possibly existing further measuring devices ME2 . . . ME5 can be fed to further state analysers ZA2 . . . ZA5, again constructed in the form of neural networks. Each of these analysers makes available a dedicated set of controlled variables ST, which is passed on for process control to the closed-loop or open-loop control devices RS4 . . . RS9 of downstream operating means in the waste paper preparation AAA and, if appropriate, to a paper machine PAM in a recycling paper plant.

What is claimed is:

1. An apparatus for controlling operation of a plant for producing deinked pulp (RP) from waste paper, which includes at least a waste paper preparation (AAA) and a dewatering machine or at least one paper machine (PAM) arranged downstream of the waste paper preparation, comprising:
   a) at least one measuring device (ME) for recording spectral or physical (IMf, Mp) characteristic values of a waste paper suspension (PS), which is fed to the waste paper preparation (AAA) or runs through the waste paper preparation (AAA),
   b) closed-loop or open-loop control devices (RS1 . . . RS8) for operating means (DS, DC, FW1, VS, RJ1, ED, DI, IC, FW2, WS, CA, NS, RJ2, FS, MW) of the waste paper preparation (AAA), and
   c) at least one state analyser (ZA), configured in the form of a neural network (NNg) or a plurality of parallel neural networks (NN1 . . . NN4), for the waste paper suspension (PS), said analyser outputting, by means of the characteristic values (IMf, MP) of the at least one measuring device (ME), controlled variables (ST: AB, AZ, FL, AA, AS, AT) for process control to closed-loop or open-loop control devices (RS1 . . . RS8) of operating means (DS, DC, FW1, VS, RJ1, ED, DI, IC, FW2, WS, CA, NS, RJ2, FS, MW) at least of the waste paper preparation (AAA);
   where the following are determined as controlled variables (ST) for process control by a common neural network (NNg) or separately by a plurality of parallel neural networks (NN1, NN2) in the at least one state analyser:
      i) the ratio (AB) of colored papers to white papers, or
      ii) the ratio (AZ) of illustrated-magazine paper to newsprint paper in the amount of waste paper (AP) processed to form the waste paper suspension (PS).

2. The apparatus according to claim 1 wherein intensities of the respective wavelength ranges reflected or transmitted by the waste paper suspension (PS) under irradiation at selected wavelength ranges of visible or infrared light are recorded as spectral characteristic values (IMf).

3. The apparatus according to claim 2 wherein the wavelength ranges belonging to the blue, red or green component of light selected for the visible light, and the intensities (WL-blue, WL-red, WL-green) reflected or transmitted by the waste paper suspension (PS) under irradiation with light of these wavelength ranges are measured as spectral characteristic values (IMf).

4. The apparatus according to claim 2 wherein the intensities in the near range (WL-IR near) or in the far range (WL-IR far) reflected or transmitted by the waste paper suspension (PS) under irradiation with light from the infrared wavelength range are measured as spectral characteristic values (IMf).

5. The apparatus according to claim 1 wherein the consistency (K) or temperature (T) of the waste paper suspension (PS) is recorded as physical characteristic values (Mp).

6. The apparatus according to claim 1 further comprising closed-loop or open-loop control devices (RS9) for operating means (ST, Vm, T) of at least one downstream paper machine (PAM), and wherein the at least one state analyser (ZA) outputs controlled variables (ST: AB, AZ, FL, AA, AS, AT) to the control devices (RS9) of the downstream paper machine for process control.

7. The apparatus according to claim 1 further comprising at least one further measuring device (ME1, ME2, ME3, ME4, ME5) arranged in the waste paper preparation (AAA), for recording spectral characteristic values (IMf) or physical characteristic values (Mp) from the waste paper suspension (PS), and at least one further state analyser (ZA1, ZA2, ZA3, ZA4, ZA5), configured in the form of a neural network (NNg) or a plurality of parallel neural networks (NN1 . . . NN4), arranged downstream of said further measuring device, wherein said further state analyser outputs the controlled variables (ST: AB, AZ, FL, AA, AS, AT) for process control to the closed-loop or open-loop control devices ( . . . RS9) of downstream operating means ( . . . VS, RJI, ED, DI, IC, FW2, WS, CA, NS, RJ2, FS, MW) at least in the waste paper preparation (AAA).

8. An apparatus for controlling operation of a plant for producing deinked pulp (RP) from waste paper, which includes at least a waste paper preparation (AAA) and a dewatering machine or at least one paper machine (PAM) arranged downstream of the waste paper preparation, comprising:
   a) at least one measuring device (ME) for recording spectral or physical (IMf, Mp) characteristic values of a waste paper suspension (PS), which is fed to the waste paper preparation (AAA) or runs through the waste paper preparation (AAA),
   b) closed-loop or open-loop control devices (RS1 . . . RS8) for operating means (DS, DC, FW1, VS, RJ1, ED, DI, IC, FW2, WS, CA, NS, RJ2, FS, MW) of the waste paper preparation (AAA), and
   c) at least one state analyser (ZA), configured in the form of a neural network (NNg) or a plurality of parallel neural networks (NN1 . . . NN4), for the waste paper suspension (PS), said analyser outputting, by means of the characteristic values (IMf, MP) of the at least one measuring device (ME), controlled variables (ST: AB, AZ, FL, AA, AS, AT) for process control to closed-loop or open-loop control devices (RS1 . . . RS8) of operating means (DS, DC, FW1, VS, RJ1, ED, DI, IC, FW2, WS, CA, NS, RJ2, FS, MW) at least of the waste paper preparation (AAA);
   where the following are determined as controlled variables (ST) for process control by a common neural network (NNg) or separately by a plurality of parallel neural networks (NN1, NN2) in the at least one state analyser:
      i) the average fibre length (FL), or
      ii) the ash content (AA) in the waste paper suspension (PS).

9. The apparatus according to claim 8 wherein intensities of the respective wavelength ranges reflected or transmitted by the waste paper suspension (PS) under irradiation at selected wavelength ranges of visible or infrared light are recorded as spectral characteristic values (IMf).

10. The apparatus according to claim 9 wherein the wavelength ranges belonging to the blue, red or green component of light selected for the visible light, and the intensities (WL-blue, WL-red, WL-green) reflected or transmitted by the waste paper suspension (PS) under irradiation with light of these wavelength ranges are measured as spectral characteristic values (IMf).

11. The apparatus according to claim 9 wherein the intensities in the near range (WL-IR near) or in the far range (WL-IR far) reflected or transmitted by the waste paper suspension (PS) under irradiation with light from the infrared wavelength range are measured as spectral characteristic values (IMf).

12. The apparatus according to claim 8 wherein the consistency (K) or temperature (T) of the waste paper suspension (PS) is recorded as physical characteristic values (Mp).

13. The apparatus according to claim 8 further comprising closed-loop or open-loop control devices (RS9) for operating means (ST, Vm, T) of at least one downstream paper machine (PAM), and wherein the at least one state analyser (ZA) outputs controlled variables (ST: AB, AZ, FL, AA, AS, AT) to the control devices (RS9) of the downstream paper machine for process control.

14. The apparatus according to claim 8 further comprising at least one further measuring device (ME1, ME2, ME3, ME4, ME5) arranged in the waste paper preparation (AAA), for recording spectral characteristic values (IMf) or physical characteristic values (Mp) from the waste paper suspension (PS), and at least one further state analyser (ZA1, ZA2, ZA3, ZA4, ZA5), configured in the form of a neural network (NNg) or a plurality of parallel neural networks (NN1 . . . NN4), arranged downstream of said further measuring device, wherein said further state analyser outputs the controlled variables (ST: AB, AZ, FL, AA, AS, AT) for process control to the closed-loop or open-loop control devices ( . . . RS9) of downstream operating means ( . . . VS, RJI, ED, DI, IC, FW2, WS, CA, NS, RJ2, FS, MW) at least in the waste paper preparation (AAA).

15. An apparatus for controlling operation of a plant for producing deinked pulp (RP) from waste paper, which includes at least a waste paper preparation (AAA) and a dewatering machine or at least one paper machine (PAM) arranged downstream of the waste paper preparation, comprising:
   a) at least one measuring device (ME) for recording spectral or physical (IMf, Mp) characteristic values of a waste paper suspension (PS), which is fed to the waste paper preparation (AAA) or runs through the waste paper preparation (AAA),
   b) closed-loop or open-loop control devices (RS1 . . . RS8) for operating means (DS, DC, FW1, VS, RJ1, ED, DI, IC, FW2, WS, CA, NS, RJ2, FS, MW) of the waste paper preparation (AAA), and
   c) at least one state analyser (ZA), configured in the form of a neural network (NNg) or a plurality of parallel neural networks (NN1 . . . NN4), for the waste paper suspension (PS), said analyser outputting, by means of the characteristic values (IMf, MP) of the at least one measuring device (ME), controlled variables (ST: AB, AZ, FL, AA, AS, AT) for process control to closed-loop or open-loop control devices (RS1 . . . RS8) of operating means (DS, DC, FW1, VS, RJ1, ED, DI, IC, FW2, WS, CA, NS, RJ2, FS, MW) at least of the waste paper preparation (AAA);
   where a count value for the following is determined as controlled variables (ST) for process control by a common neural network (NNg) or separately by a plurality of parallel neural networks (NN1, NN2) in the at least one state analyser:
      i) for the content of dirt (AS), or
      ii) for the content of adhesive contaminants (AT) in the waste paper suspension (PS).

16. The apparatus according to claim 15 wherein intensities of the respective wavelength ranges reflected or transmitted by the waste paper suspension (PS) under irradiation at selected wavelength ranges of visible or infrared light are recorded as spectral characteristic values (IMf).

17. The apparatus according to claim 16 wherein the wavelength ranges belonging to the blue, red or green component of light selected for the visible light, and the intensities (WL-blue, WL-red, WL-green) reflected or transmitted by the waste paper suspension (PS) under irradiation with light of these wavelength ranges are measured as spectral characteristic values (IMf).

18. The apparatus according to claim 16 wherein the intensities in the near range (WL-IR near) or in the far range (WL-IR far) reflected or transmitted by the waste paper suspension (PS) under irradiation with light from the infrared wavelength range are measured as spectral characteristic values (IMf).

19. The apparatus according to claim 15 wherein the consistency (K) or temperature (T) of the waste paper suspension (PS) is recorded as physical characteristic values (Mp).

20. The apparatus according to claim 15 further comprising closed-loop or open-loop control devices (RS9) for operating means (ST, Vm, T) of at least one downstream paper machine (PAM), and wherein the at least one state analyser (ZA) outputs controlled variables (ST: AB, AZ, FL, AA, AS, AT) to the control devices (RS9) of the downstream paper machine for process control.

21. The apparatus according to claim 15 further comprising at least one further measuring device (ME1, ME2, ME3, ME4, ME5) arranged in the waste paper preparation (AAA), for recording spectral characteristic values (IMf) or physical characteristic values (Mp) from the waste paper suspension (PS), and at least one further state analyser (ZA1, ZA2, ZA3, ZA4, ZA5), configured in the form of a neural network (NNg) or a plurality of parallel neural networks (NN1 . . . NN4), arranged downstream of said further measuring device, wherein said further state analyser outputs the controlled variables (ST: AB, AZ, FL, AA, AS, AT) for process control to the closed-loop or open-loop control devices ( . . . RS9) of downstream operating means ( . . . VS, RJI, ED, DI, IC, FW2, WS, CA, NS, RJ2, FS, MW) at least in the waste paper preparation (AAA).

* * * * *